US009161035B2

(12) United States Patent
Maani et al.

(10) Patent No.: US 9,161,035 B2
(45) Date of Patent: Oct. 13, 2015

(54) FLEXIBLE BAND OFFSET MODE IN SAMPLE ADAPTIVE OFFSET IN HEVC

(71) Applicant: SONY CORPORATION, Tokyo (JP)

(72) Inventors: Ehsan Maani, San Jose, CA (US); Ali Tabatabai, Cupertino, CA (US); Jun Xu, Sunnyvale, CA (US)

(73) Assignee: SONY CORPORATION, Tokyo (JP)

(*) Notice: Subject to any disclaimer, the term of this patent is extended or adjusted under 35 U.S.C. 154(b) by 541 days.

(21) Appl. No.: 13/674,653

(22) Filed: Nov. 12, 2012

(65) Prior Publication Data

US 2013/0188737 A1 Jul. 25, 2013

Related U.S. Application Data

(60) Provisional application No. 61/589,127, filed on Jan. 20, 2012.

(51) Int. Cl.
H04N 7/12 (2006.01)
H04N 11/02 (2006.01)
H04N 11/04 (2006.01)
H04N 19/44 (2014.01)
H04N 19/176 (2014.01)
H04N 19/117 (2014.01)
H04N 19/14 (2014.01)
H04N 19/82 (2014.01)
H04N 19/86 (2014.01)

(52) U.S. Cl.
CPC ....... H04N 19/00533 (2013.01); H04N 19/117 (2014.11); H04N 19/14 (2014.11); H04N 19/176 (2014.11); H04N 19/44 (2014.11); H04N 19/82 (2014.11); H04N 19/86 (2014.11)

(58) Field of Classification Search
CPC ..... H04N 19/117; H04N 19/82; H04N 19/46; H04N 19/85; H04N 1/409
USPC ........................................ 375/240.01–240.29
See application file for complete search history.

(56) References Cited

U.S. PATENT DOCUMENTS

| 2006/0039472 A1 | 2/2006 | Barbarien et al. |
| 2007/0016414 A1 | 1/2007 | Mehrotra et al. |
| 2011/0106529 A1 | 5/2011 | Disch |
| 2011/0274158 A1 | 11/2011 | Fu et al. |
| 2011/0305274 A1 | 12/2011 | Fu et al. |

OTHER PUBLICATIONS

Ehsan Maani / Sony Electronics, Ehsan Maani's Overview, http://www.linkedin.com/pub/ehsan-maani/14/36/b9a, 2011, pp. 1-5.
Ryu, E.K., "Sample Adaptive Offset," MS Office Power Point presentation, Jul. 30, 2011, Kwangwoon University, Seoul, South Korea, pp. 1-17.
United States Patent and Trademark Office, International Search Report and Written Opinion (pp. 1-12), issued on Feb. 22, 2013 for corresponding International Patent Application No. PCT/US2012/69024, including claims searched (pp. 13-17) pp. 1-17.

Primary Examiner — Andy Rao
Assistant Examiner — Jared Walker
(74) Attorney, Agent, or Firm — John P. O'Banion

(57) ABSTRACT

A Flexible Band Offset (FBO) apparatus and method of performing Sample Adaptive Offset (SAO) filtering within encoders and decoders, such as according to the High Efficiency Video Coding (HEVC) standard, and similarly configured coding devices. The number of Band Offset (BO) modes and the number of necessary offsets is reduced. The invention beneficially provides simpler coding, reduces temporary buffer size requirements, and can yield a small performance gain over existing SAO techniques of HEVC test model HM 5.

20 Claims, 4 Drawing Sheets

FLEXIBLE BAND OFFSET MODE IN SAMPLE ADAPTIVE OFFSET IN HEVC

CROSS-REFERENCE TO RELATED APPLICATIONS

This application is a nonprovisional of U.S. provisional patent application Ser. No. 61/589,127 filed on Jan. 20, 2012, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video encoding and decoding, and more particularly to Sample Adaptive Offset (SAO) within high-efficiency video coding (HEVC) systems.

2. Description of Related Art

Demand continues for increased video resolution and associated coding systems which optimize compression of these videos, while being scalable across the range of target resolutions. The latest efforts in this direction by the Joint Collaborative Team on Video Coding (JCT-VC) of ITU-T and ISO/IEC MPEG aim to support ultra high resolution and mobile applications as well as reduce the bitrate compressed in H.264/AVC coding systems, within a High Efficiency Video Coding (HEVC) standard.

Unlike many previous coding systems, HEVC divides frames into Coding Tree Blocks (CTBs) that can be further subdivided into Coding Units (CUs), such as using quadtree segmentation. A coding unit (CU) may have variable sizes depending on video content toward achieving a desired coding efficiency. CUs typically include a luminance component Y and two chroma components, U and V. The size of U and V components relate to the number of samples, and can be the same or different from that of the Y component, as depends upon the video sampling format. The CUs can be further subdivided into Prediction Unit (PU) partitions during intra-prediction and inter-prediction as well as Transform Units (TUs) defined for transform and quantization. Transform units (TU) generally refer to a block of residual data to which a transform is applied when generating transform coefficients.

HEVC introduces new elements over current video coding systems, such as H.264/AVC, and similar codecs. For example, although HEVC still involves motion compensated inter predictions, transforms, and entropy coding, it utilizes either arithmetic coding or variable length coding. In addition, following the deblocking filter is a new Sample Adaptive Offset (SAO) filter. The SAO unit considers the entire frame as a hierarchical quadtree. Quadrants in this quadtree are activated by the SAO transmitting syntax values which each represent an intensity band of pixel values referred to as band offset (BO) or the difference compared to neighboring pixel intensities referred to as edge offset (EO). For each type in SAO (BO and EO), transmitted offset values referred to as SAO offset will be added to the corresponding pixels.

In the HM 5.0 version of HEVC, there are four (4) EO (Edge Offset) modes and two (2) BO (Band Offset) modes for Sample Adaptive Offset (SAO). EO modes transmit four (4) offsets while BO modes transmit sixteen (16) offsets. Therefore, a temporary buffer is needed at the decoder to store SAO offsets for each partition until the image (or parts of it) are decoded.

BRIEF SUMMARY OF THE INVENTION

The present invention is directed at an inventive Sample Adaptive Offset (SAO) method within HEVC and similar encoders and/or decoders. Specifically, a Flexible Band Offset (FBO) method of SAO is taught which reduces the number of Band Offset (BO) modes from two (2) to one (1) and reduces the number of SAO offsets for BO from sixteen (16) to four (4). Accordingly, inventive embodiments provide four (4) SAO offsets regardless of the SAO mode (EO or BO). Since the maximum number of SAO offsets is reduced (from 16 to 4), the temporary buffer required at the decoder to hold the SAO parameters is beneficially reduced by approximately 75%. Simulation results illustrate obtaining a small performance gain, in particular for chroma components, in response to utilizing the inventive method.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

The inventive flexible band offset (FBO) method of the invention can be implemented in both encoder and decoder apparatus as described in the following paragraphs.

Figure 1:
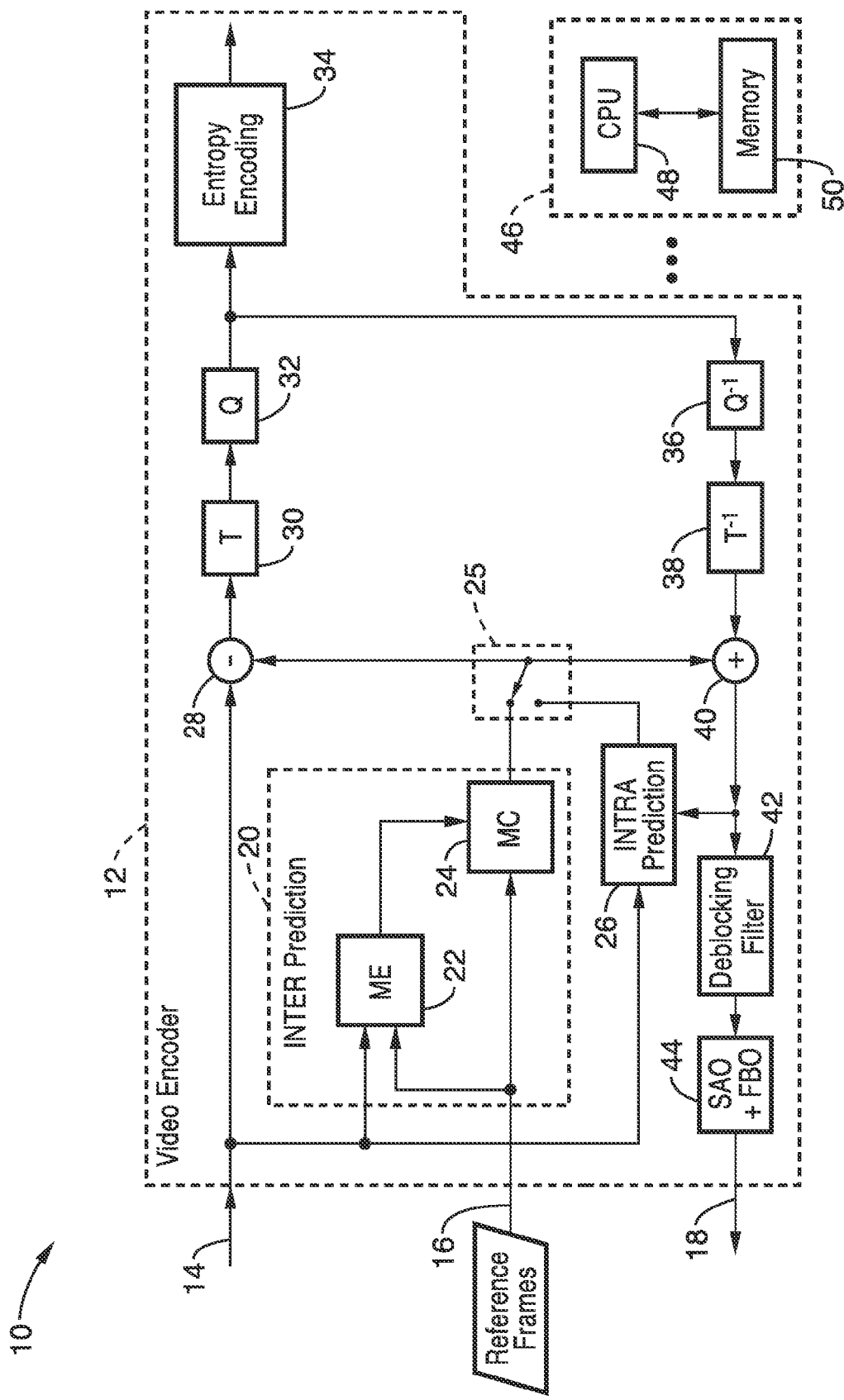
FIG. 1 is a schematic of a video encoder according to an embodiment of the present invention.

FIG. 1 illustrates an example embodiment of a coding apparatus comprising an encoder 10 according to the invention for performing FBO modes within sample adaptive offsets (SAO) following the deblocking filter.

The encoder 10 is shown with encoding elements 12 executed by a computing means 46 exemplified with one or more processors 48, along with one or more memory devices 50. It will be appreciated that elements of the present invention can be implemented as programming stored on a media, which can be accessed for execution by a CPU for an encoder and/or decoder.

In the example, video frame input 14 is shown along with reference frames 16 and frame output 18. Inter-prediction 20 is depicted with motion estimation (ME) 22 and motion compensation (MC) 24. Intra-prediction 26 is shown with switching 25 depicted between inter-prediction and intra-prediction. A sum junction 28 is shown with output to a forward transform 30 which is performed based on the predictions to generate transform coefficients of residual data. Quantization of the transform coefficients is performed at quantization stage 32, which is followed by entropy encoding 34. Inverse quantization 36 and inverse transform 38 operations are shown coupled to a summing junction 40.

Output of summing junction 40, is a decoded video signal which is received by a deblocking filter 42, the Sample Adaptive Offset (SAO) filter with inventive FBO modes 44 according to the present invention to produce an output 18.

Figure 2:
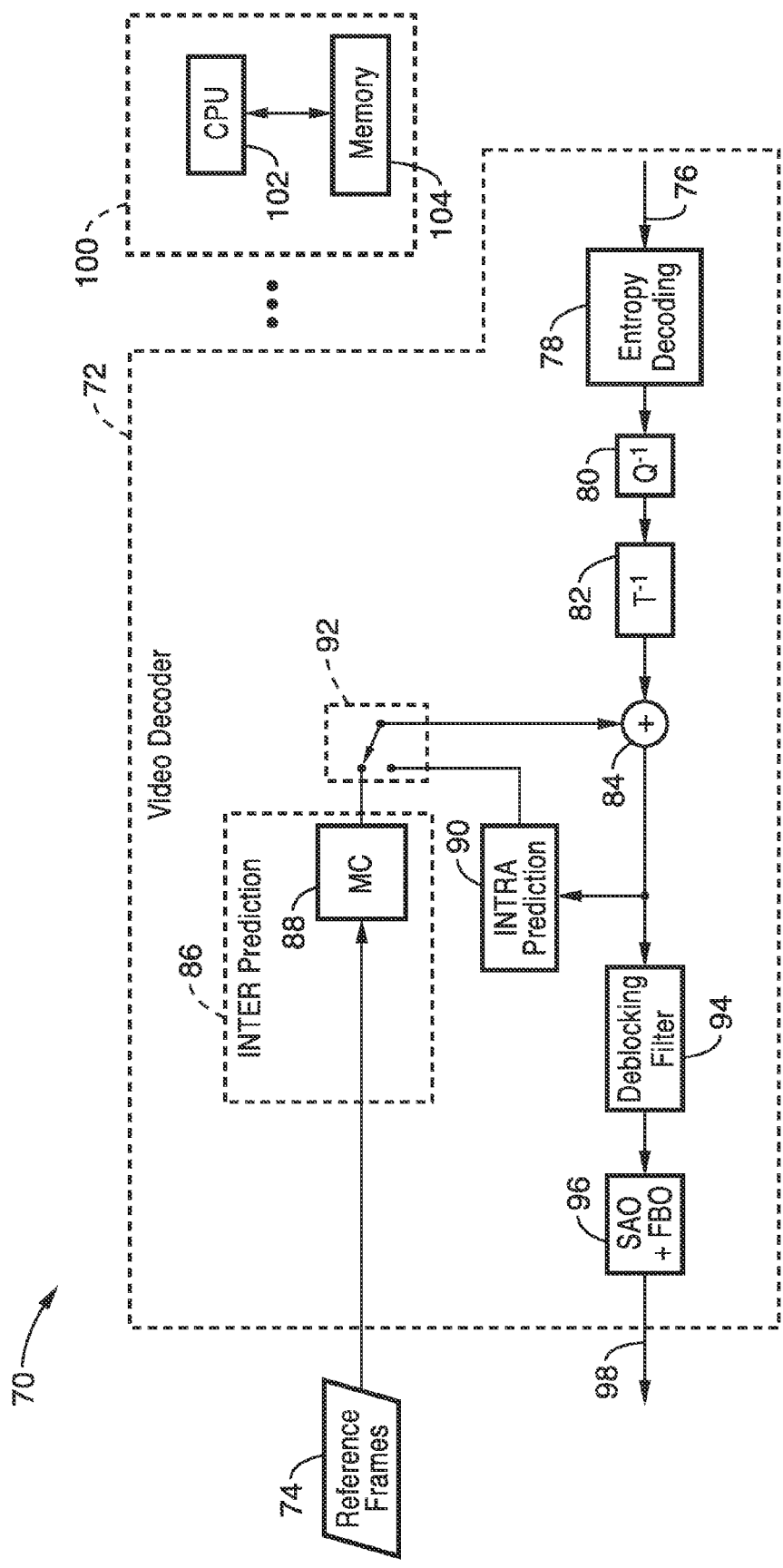
FIG. 2 is a schematic of a video decoder according to an embodiment of the present invention.

FIG. 2 illustrates an example embodiment 70 of a decoder, shown with process blocks 72 and an associated processing means 102. It will be noted that the decoder is substantially a subset of the elements contained in encoder 10 of FIG. 1, operating on reference frames 74 and outputting video signal 100. The decoder blocks receive an encoded video signal 76 which is processed through entropy decoder 78, inverse quantization 80, inverse transform 82, and summing 84 between the inverse transform 82 output and the selection 92 between inter-prediction 86 shown with motion compensation 88 and a separate intra-prediction block 90. Output from summing junction 84 is received by a deblocking filter 94, followed by SAO module with inventive Flexible Band Offset (FBO) modes 96 according to the present invention to produce a video output 98.

It should be appreciated that the decoder can be implemented with a processing means 100 which comprises at least one processing device 102 and at least one memory 104 for executing programming associated with the decoding. In addition, it will be noted that elements of the present invention can be implemented as programming stored on a media, wherein said media can be accessed for execution by processing device (CPU) 102.

It will be recognized that elements of the present invention 10 and 70 are implemented for execution by a processing means 46 and 100, such as in response to programming resident in memory 50 and 104 which is executable on computer processor (CPU) 48 and 102. In addition, it will be appreciated that elements of the present invention can be implemented as programming stored on a media, wherein said media can be accessed for execution by CPU 48 and/or 102.

It should also be appreciated that the above programming is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

Figure 3A:
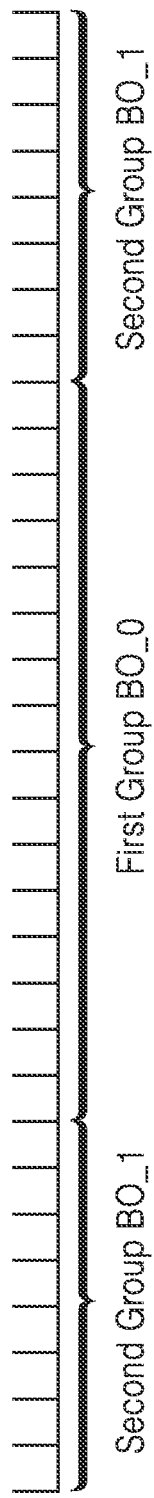
FIG. 3A is a data diagram of conventional SAO BO mode utilized in existing HEVC coding under test model HM 5.0.
Figure 3B:
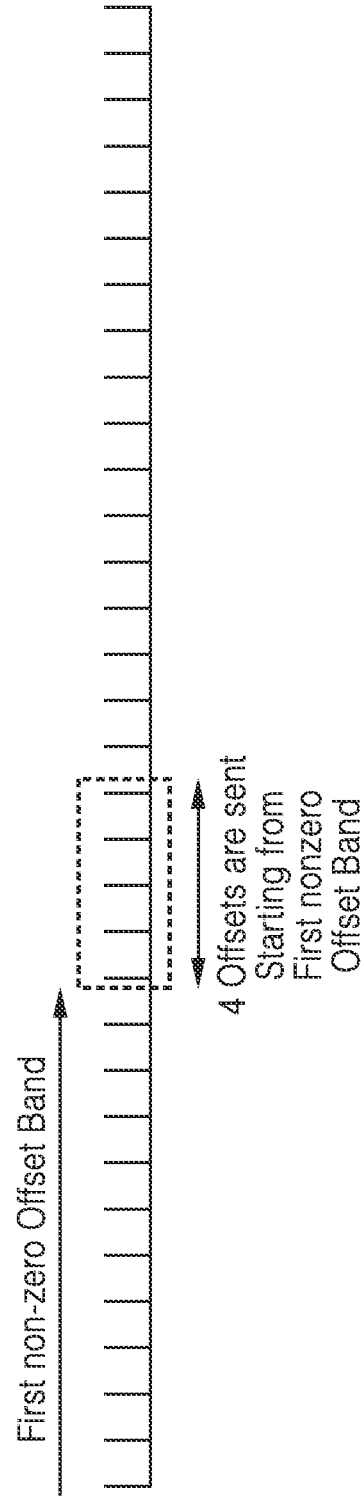
FIG. 3B is a data diagram of SAO with Flexible Band Offsets (FBO) SAO filtering according to an embodiment of the present invention.

FIG. 3A and FIG. 3B compare current HEVC SAO filter operation (FIG. 3A) with the inventive flexible band offset SAO filter of the current invention (FIG. 3B). In FIG. 3A an example is seen of two SAO types based on band offset (BO), in which the first type (First Group BO_0) has central bands, and the second type (Second Group BO_1) has side bands seen on each end of the band structure. Toward reducing side information down to 16 offsets in the conventional SAO, the original 32 uniform bands are divided into two groups as seen in the figure, with the 16 bands in the center assigned to group 1 and the 16 bands on both sides assigned to group 2. Accordingly, one set of SAO offsets is sent for the center 16 bands (group 1), and one set of SAO offsets is sent for the outer 16 bands (group 2).

There has been some discussions of increasing the number of BO modes with various numbers of offsets. However, this would further complicate the design. The present invention is directed contrary to such offset increases and operates toward simplifying the design, minimizing the temporary buffer at the decoder, and unifying the number of SAO offsets for EO and BO modes. The present invention teaches a method for utilizing only one BO mode with four (4) SAO offsets, thus unifying the number of SAO offsets across the SAO modes.

In the present inventive apparatus and method, only a single band offset type is necessary. The encoder determines four (4) consecutive bands for which a SAO offset will be transmitted. It should be appreciated that the encoder may pick the four consecutive bands based on most distortion impact, or may utilize any other desired criterion, without departing from the teachings of the present invention. The rest of the bands are assumed to have a zero SAO offset. Since there are 32 possible BO bands in the current design, the first band for which an SAO offset is transmitted (i.e., first_band) is between 0 to 31. Thus, the encoder uses a 5-bit Fixed Length (FL) code to indicate first_band to the decoder. The offsets are depicted in FIG. 3B showing first non-zero offset band, with 4 SAO offsets shown with the dotted lines starting from the first non-zero offset band.

After the first non-zero offset band, the four consecutive bands with SAO offsets are determined in response to adding an offset i to the first band and using the modulo remainder based on number of BO bands $N_{Bands}$ such as (first_band+i) % $N_{Bands}$ where i∈[0,4). By way of example and not limitation, the number of bands $N_{Bands}$ is 32. Thus, the number of possible offsets transmitted for the remaining bands is substantially reduced, such as in the above example, from sixteen (16) SAO offsets down to four (4) SAO offsets.

Figure 4B:
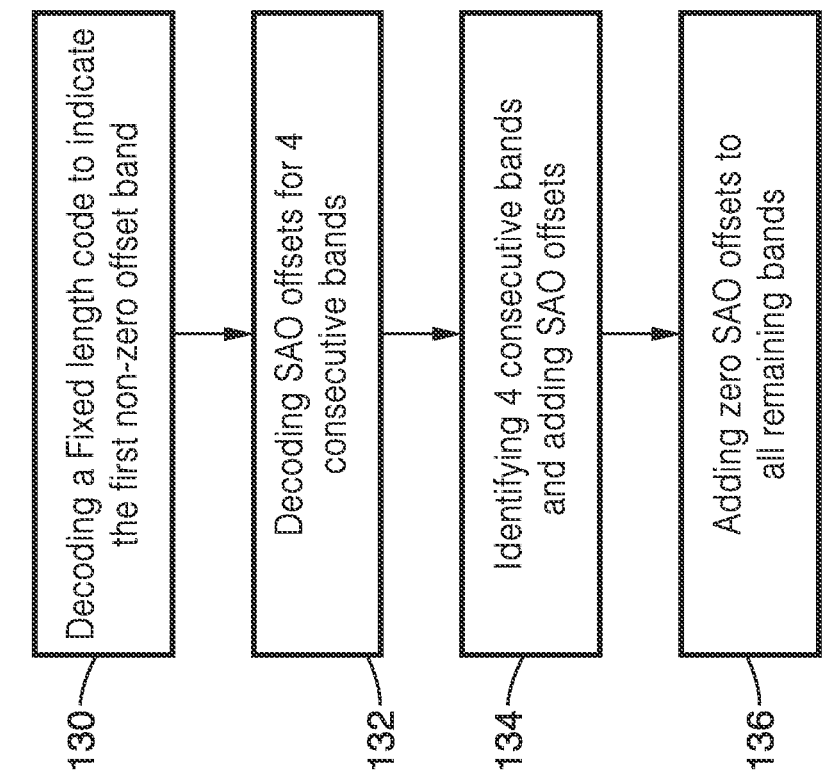
FIG. 4A and FIG. 4B are flow diagrams of a Flexible Band Offset (FBO) method of performing Sample Adaptive Offsets within an HEVC coding system according to an embodiment of the present invention within an encoder (FIG. 4A) and a decoder (FIG. 4B).
Figure 4A:
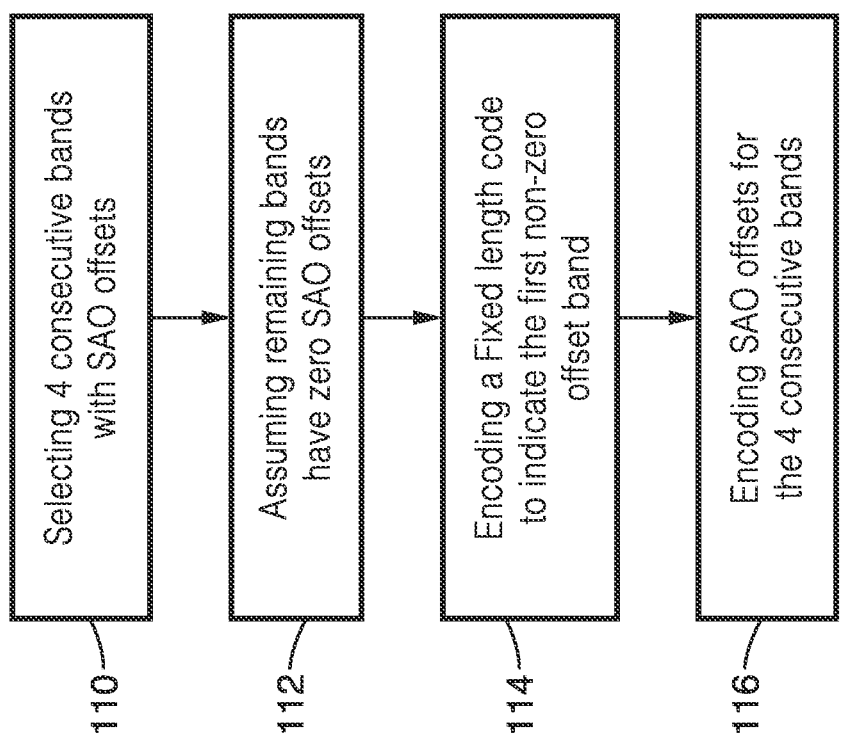

FIG. 4A is a summary of an example embodiment of the Flexible Band Offset method for the SAO filter operating in the encoder. Four consecutive bands with SAO offsets are determined (selected) at step 110, while the remaining bands are assumed to have zero SAO offsets at step 112. Then a fixed length code is encoded at step 114 for indicating to a decoder the exact position of this first band. The position of the consecutive bands with SAO offsets is indicated and each band encodes a SAO offset as per step 116. As a result of the invention, the number of BO modes are reduced from two to one, while the SAO offsets required for BO is reduced from sixteen to four.

FIG. 4B is a summary of an example embodiment of this Flexible Band Offset method for the SAO filter operating in the decoder. The fixed length code received from the encoder is decoded to indicate 130 the first non-zero offset band. At step 132, SAO offsets for the four consecutive bands are decoded. Then the four consecutive band positions are determined in response to adding SAO offsets, comprising an offset i, which preferably can only assume values from 0 to 3, to the first band and using the modulo remainder based on number of BO bands, and decoded SAO offsets are added to corresponding bands at step 134. The remaining bands other than the four consecutive bands are added with zero SAO offsets at step 136.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the invention can be embodied in various ways, including the following:

1. An apparatus for sample adaptive offset (SAO) signaling during entropy encoding and decoding of video, comprising: (a) a video encoder having a computer processor; (b) programming executable on said video encoder computer processor for: (i) receiving a decoded video signal from a deblocking filter; (ii) setting a fixed length code within an encoder, for transmission to a decoder, in response to steps comprising: (A) selecting four consecutive bands for which an SAO offset for each will be transmitted; (B) assuming remaining bands have zero SAO offsets; (C) encoding a fixed length code indicating extent of offset for a first non-zero band offset (BO) of said four consecutive bands; and (D) generating positioning for said four consecutive bands by adding an offset to said first non-zero band offset (BO) and using the modulo remainder based on number of BO bands and encoding SAO offset for each; (c) a video decoder having a computer processor; (d) programming executable on said video decoder computer processor for: (i) sample adaptive offset filtering of an encoded video signal based on receiving said fixed length code within said video decoder, in response to steps comprising: (A) determining position of said first band based on decoding said fixed length code; (B) decoding four SAO offsets for four consecutive bands determined during encoding; (C) determining position of remaining bands in response to adding an offset to said first band and taking a modulo remainder based on number of BO bands and adding decoded SAO offsets to them; and (D) adding zero SAO offsets to all remaining bands.

2. The apparatus of any preceding embodiment, wherein said system for encoding and decoding of video operates according to a High Efficiency Video Coding (HEVC) standard.

3. The apparatus of any preceding embodiment, wherein said system requires only one band offset (BO) type.

4. The apparatus of any preceding embodiment, wherein number of SAO offsets for said BO bands are reduced from 16 to 4.

5. The apparatus of any preceding embodiment, wherein said reduction of possible SAO offsets from 16 to 4 reduces necessary temporary buffering by approximately 75%.

6. The apparatus of any preceding embodiment, wherein programming executable on said video encoder computer processor is configured for transmitting thirty two possible BO bands for said first non-zero band.

7. The apparatus of any preceding embodiment, wherein programming executable on said video encoder computer processor is configured for generating positioning for the four consecutive bands by adding an offset i to said first non-zero band and uses a modulo remainder based on number of BO bands $N_{Bands}$, as (first_band+i) % $N_{Bands}$ where i∈[0,4)

8. An apparatus for sample adaptive offset filtering during video entropy encoding, comprising: (a) a video encoder having a computer processor; (b) programming executable on said video encoder computer processor for: (i) receiving a decoded video signal from a deblocking filter; (ii) setting a fixed length code within an encoder, for transmission to a decoder, in response to steps comprising: (A) selecting four consecutive bands for which an SAO offset for each will be transmitted; (B) assuming remaining bands have zero SAO offsets; (C) encoding a fixed length code indicating extent of offset for a first non-zero band offset (BO); and (D) generating positioning for said four consecutive bands by adding an offset to said first non-zero band offset (BO) and using the modulo remainder based on number of BO bands and encoding SAO offset for each.

9. The apparatus of any preceding embodiment, wherein said programming executable on said video encoder computer processor utilizes a single band offset (BO) type.

10. The apparatus of any preceding embodiment, wherein programming executable on said video encoder computer processor generates 4 possible SAO offsets for said consecutive bands which is a reduction compared to 16 possible SAO offsets on a conventional HEVC apparatus.

11. The apparatus of any preceding embodiment, wherein said reduction of SAO offsets reduces necessary temporary buffering by approximately 75%.

12. The apparatus of any preceding embodiment, wherein said programming executable on said video encoder computer processor is configured for transmitting thirty two possible BO bands for said first non-zero band.

13. The apparatus of any preceding embodiment, wherein said programming executable on said video encoder computer processor generates positioning for said four consecutive bands by adding an offset i to said first non-zero band and determines a modulo remainder based on number of BO bands $N_{Bands}$, as (first_band+i) % $N_{Bands}$ where i∈[0,4).

14. An apparatus for sample adaptive offset filtering during video entropy decoding, comprising: (a) a video decoder having a computer processor; (b) programming executable on said video decoder computer processor for: (i) sample adaptive offset filtering of video within said video decoder from a received encoded video signal containing a fixed length code, having steps comprising: (A) determining position of said first non-zero band offset (BO) based on decoding said fixed length code; (B) decoding four SAO offsets for four consecutive bands determined during encoding; (C) determining position of remaining bands in response to adding an offset to said first non-zero band and taking a modulo remainder based on number of BO bands and adding decoded SAO offsets to them; and (D) adding zero SAO offsets to all remaining bands.

15. The apparatus of any preceding embodiment, wherein said programming executable on said video decoder computer processor performs sample adaptive offset filtering requiring only a single band offset (BO) type.

16. The apparatus of any preceding embodiment, wherein programming executable on said video decoder computer processor utilizes 4 possible SAO offsets for said consecutive bands which is a reduction compared to 16 possible SAO offsets on a conventional HEVC apparatus.

17. The apparatus of any preceding embodiment, wherein said reduction of possible SAO offsets from 16 to 4 reduces necessary temporary buffering by approximately 75%.

18. The apparatus of any preceding embodiment, wherein said programming executable on said video decoder computer processor is configured for utilizing thirty two possible BO bands for said first non-zero band.

19. The apparatus of any preceding embodiment, wherein said programming executable on said video decoder computer processor decodes positioning information from said encoded video signal for remaining bands having an offset i added to said first non-zero band and determines a modulo remainder based on number of BO bands $N_{Bands}$, as (first_band+i) % $N_{Bands}$ where i∈[0,4).

20. The apparatus of any preceding embodiment, wherein said apparatus for sample adaptive offset filtering during video entropy decoding operates according to a High Efficiency Video Coding (HEVC) standard.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for sample adaptive offset (SAO) signaling during entropy encoding and decoding of video, comprising:
    (a) a video encoder having a computer processor and memory storing programming;
    (b) programming executable on said video encoder computer processor for:
        (i) receiving a decoded video signal from a deblocking filter;
        (ii) setting a fixed length code within an encoder, for transmission to a decoder, in response to steps comprising:
            (A) selecting four consecutive bands for which an SAO offset for each will be transmitted;
            (B) assuming remaining bands have zero SAO offsets;
            (C) encoding a fixed length code indicating extent of offset for a first non-zero band offset (BO) of said four consecutive bands; and
            (D) generating positioning for said four consecutive bands by adding an offset to said first non-zero band offset (BO) and using the modulo remainder based on number of BO bands and encoding SAO offset for each;
    (c) a video decoder having a computer processor and memory storing programming;
    (d) programming executable on said video decoder computer processor for:
        (i) sample adaptive offset filtering of an encoded video signal based on receiving said fixed length code within said video decoder, in response to steps comprising:
            (A) determining position of said first band based on decoding said fixed length code;
            (B) decoding four SAO offsets for four consecutive bands determined during encoding;
            (C) determining position of remaining bands in response to adding an offset to said first band and taking a modulo remainder based on number of BO bands and adding decoded SAO offsets to them; and
            (D) adding zero SAO offsets to all remaining bands.

2. The apparatus recited in claim 1, wherein said system for encoding and decoding of video operates according to a High Efficiency Video Coding (HEVC) standard.

3. The apparatus recited in claim 1, wherein said system requires only one band offset (BO) type.

4. The apparatus recited in claim 1, wherein number of SAO offsets for said BO bands are reduced from 16 to 4.

5. The apparatus recited in claim 4, wherein said reduction of possible SAO offsets from 16 to 4 reduces necessary temporary buffering by approximately 75%.

6. The apparatus recited in claim 1, wherein programming executable on said video encoder computer processor is configured for transmitting thirty two possible BO bands for said first non-zero band.

7. The apparatus recited in claim 1, wherein programming executable on said video encoder computer processor is configured for generating positioning for the four consecutive bands by adding an offset i to said first non-zero band and uses a modulo remainder based on number of BO bands $N_{Bands}$, as (first_band+i) % $N_{Bands}$ where i∈[0,4).

8. An apparatus for sample adaptive offset filtering during video entropy encoding, comprising:
  (a) a video encoder having a computer processor and memory storing programming;
  (b) programming executable on said video encoder computer processor for:
    (i) receiving a decoded video signal from a deblocking filter;
    (ii) setting a fixed length code within an encoder, for transmission to a decoder, in response to steps comprising:
      (A) selecting four consecutive bands for which an SAO offset for each will be transmitted;
      (B) assuming remaining bands have zero SAO offsets;
      (C) encoding a fixed length code indicating extent of offset for a first non-zero band offset (BO); and
      (D) generating positioning for said four consecutive bands by adding an offset to said first non-zero band offset (BO) and using the modulo remainder based on number of BO bands and encoding SAO offset for each.

9. The apparatus recited in claim 8, wherein said programming executable on said video encoder computer processor utilizes a single band offset (BO) type.

10. The apparatus recited in claim 8, wherein programming executable on said video encoder computer processor generates 4 possible SAO offsets for said consecutive bands which is a reduction compared to 16 possible SAO offsets on a conventional HEVC apparatus.

11. The apparatus recited in claim 10, wherein said reduction of SAO offsets reduces necessary temporary buffering by approximately 75%.

12. The apparatus recited in claim 8, wherein said programming executable on said video encoder computer processor is configured for transmitting thirty two possible BO bands for said first non-zero band.

13. The apparatus recited in claim 8, wherein said programming executable on said video encoder computer processor generates positioning for said four consecutive bands by adding an offset i to said first non-zero band and determines a modulo remainder based on number of BO bands $N_{Bands}$, as (first_band+i) % $N_{Bands}$ where i∈[0,4).

14. An apparatus for sample adaptive offset filtering during video entropy decoding, comprising:
  (a) a video decoder having a computer processor and memory storing programming;
  (b) programming executable on said video decoder computer processor for:
    (i) sample adaptive offset filtering of video within said video decoder from a received encoded video signal containing a fixed length code, having steps comprising:
      (A) determining position of said first non-zero band offset (BO) based on decoding said fixed length code;
      (B) decoding four SAO offsets for four consecutive bands determined during encoding;
      (C) determining position of remaining bands in response to adding an offset to said first non-zero band and taking a modulo remainder based on number of BO bands and adding decoded SAO offsets to them; and
      (D) adding zero SAO offsets to all remaining bands.

15. The apparatus recited in claim 14, wherein said programming executable on said video decoder computer processor performs sample adaptive offset filtering requiring only a single band offset (BO) type.

16. The apparatus recited in claim 14, wherein programming executable on said video decoder computer processor utilizes 4 possible SAO offsets for said consecutive bands which is a reduction compared to 16 possible SAO offsets on a conventional HEVC apparatus.

17. The apparatus recited in claim 16, wherein said reduction of possible SAO offsets from 16 to 4 reduces necessary temporary buffering by approximately 75%.

18. The apparatus recited in claim 14, wherein said programming executable on said video decoder computer processor is configured for utilizing thirty two possible BO bands for said first non-zero band.

19. The apparatus recited in claim 14, wherein said programming executable on said video decoder computer processor decodes positioning information from said encoded video signal for remaining bands having an offset i added to said first non-zero band and determines a modulo remainder based on number of BO bands $N_{Bands}$, as (first_band+i) % $N_{Bands}$ where i∈[0,4).

20. The apparatus recited in claim 14, wherein said apparatus for sample adaptive offset filtering during video entropy decoding operates according to a High Efficiency Video Coding (HEVC) standard.

\* \* \* \* \*